United States Patent
Chandwani et al.

(10) Patent No.: US 7,702,966 B2
(45) Date of Patent: Apr. 20, 2010

(54) METHOD AND APPARATUS FOR MANAGING SOFTWARE ERRORS IN A COMPUTER SYSTEM

(75) Inventors: Neelam Chandwani, Portland, OR (US); Udayan Mukherjee, Portland, OR (US); Chetan Hiremath, Portland, OR (US); Rakesh Dodeja, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 11/220,796

(22) Filed: Sep. 7, 2005

(65) Prior Publication Data

US 2007/0055914 A1 Mar. 8, 2007

(51) Int. Cl.
*G06F 11/34* (2006.01)
(52) U.S. Cl. .......................... 714/47; 714/38
(58) Field of Classification Search ............ 714/38, 714/47
See application file for complete search history.

(56) References Cited

U.S. PATENT DOCUMENTS

| | | | | |
|---|---|---|---|---|
| 5,291,494 A * | 3/1994 | Bruckert et al. | | 714/24 |
| 5,715,386 A * | 2/1998 | Fulton et al. | | 714/38 |
| 5,764,651 A * | 6/1998 | Bullock et al. | | 714/708 |
| 5,948,112 A * | 9/1999 | Shimada et al. | | 714/16 |
| 6,173,684 B1 * | 1/2001 | Buehrle et al. | | 123/90.12 |
| 6,401,217 B1 * | 6/2002 | Clark et al. | | 714/20 |
| 6,457,142 B1 * | 9/2002 | Klemm et al. | | 714/38 |
| 6,594,774 B1 * | 7/2003 | Chapman et al. | | 714/2 |
| 6,594,784 B1 * | 7/2003 | Harper et al. | | 714/47 |
| 6,629,266 B1 * | 9/2003 | Harper et al. | | 714/38 |
| 7,000,154 B1 * | 2/2006 | LeDuc et al. | | 714/47 |
| 7,243,266 B2 * | 7/2007 | Hiramatsu et al. | | 714/37 |
| 7,321,992 B1 * | 1/2008 | Vellore et al. | | 714/47 |
| 7,343,551 B1 * | 3/2008 | Bourdev | | 715/209 |
| 2002/0144178 A1 * | 10/2002 | Castelli et al. | | 714/15 |
| 2002/0188887 A1 * | 12/2002 | Largman et al. | | 714/13 |
| 2003/0036882 A1 * | 2/2003 | Harper et al. | | 702/186 |
| 2003/0037289 A1 * | 2/2003 | Singh et al. | | 714/38 |
| 2003/0065986 A1 * | 4/2003 | Fraenkel et al. | | 714/47 |
| 2003/0167421 A1 * | 9/2003 | Klemm | | 714/37 |
| 2004/0003319 A1 * | 1/2004 | Ukai et al. | | 714/25 |
| 2004/0153847 A1 * | 8/2004 | Apte et al. | | 714/43 |
| 2004/0255183 A1 * | 12/2004 | Takahashi | | 714/3 |
| 2005/0028133 A1 * | 2/2005 | Ananth et al. | | 717/105 |
| 2005/0091520 A1 * | 4/2005 | Khan et al. | | 713/194 |
| 2005/0246590 A1 * | 11/2005 | Lancaster | | 714/47 |

(Continued)

FOREIGN PATENT DOCUMENTS

JP 02207347 A * 8/1990

OTHER PUBLICATIONS

Blanton, Alex, "Microsoft Computer Dictionary," 2002, Microsoft Press, 5th, p. 337.*

*Primary Examiner*—Scott T Baderman
*Assistant Examiner*—Chae Ko
(74) *Attorney, Agent, or Firm*—L. Cho (57) ABSTRACT

A method for managing a system includes monitoring a plurality of applications running in the system for errors. A prediction is made as to whether errors detected would result in a failure. Fault recovery is initiated in response to a failure prediction. According to one aspect of the present invention, monitoring the plurality of applications includes reading error recorders associated with error occurrence. Other embodiments are described and claimed.

25 Claims, 7 Drawing Sheets

U.S. PATENT DOCUMENTS

| | | | |
|---|---|---|---|
| 2005/0246591 A1* | 11/2005 | Johnson et al. | 714/47 |
| 2005/0257094 A1* | 11/2005 | Dawkins et al. | 714/38 |
| 2006/0010352 A1* | 1/2006 | Mukherjee et al. | 714/47 |
| 2006/0015773 A1* | 1/2006 | Singh et al. | 714/13 |
| 2006/0026467 A1* | 2/2006 | Nehab et al. | 714/38 |
| 2007/0038885 A1* | 2/2007 | Hartung | 714/4 |

* cited by examiner

METHOD AND APPARATUS FOR MANAGING SOFTWARE ERRORS IN A COMPUTER SYSTEM

FIELD

An embodiment of the present invention relates to error management of applications run on a computer system. More specifically, an embodiment of the present invention relates to a method and apparatus for detecting errors and predicting failure of applications on a computer system.

BACKGROUND

Software applications running on computer systems may experience a variety of errors that may affect its operational state. Errors which software applications may experience include, for example, errors relating to memory allocation, memory corruption, segment violation, unexpected state transitions, interprocess communication between applications, and timer related system calls. It is important for a computer system to recognize an application's operational state in order to allow for the computer system to take recovery actions and prevent the degradation of operational services.

Some software applications are capable of logging errors internally to be reviewed by the computer system user or a system manager. Other software applications are capable of generating an error report that may be transmitted outside the computer system to be reviewed by a software developer. These logs or reports typically include information about the error, such as the time it occurred and information about the nature of the error. Although these applications are capable of logging and reporting errors, no further action is typically taken during the application run time. Eventually, if the errors reach a high enough severity level, the result may be a software application failure or worse, an operating system failure. These failures may cause valuable data to be lost from the application. In the event of an operating system failure, data may also be lost from other applications and operational services may be interrupted.

Thus, what is needed is an effective method and apparatus for managing errors in a computer system to predict failures in advance and to take appropriate recovery action.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 2 illustrates a first embodiment of a computer system in which the fault prediction module may reside in.

FIG. 3 illustrates a second embodiment of a computer system in which the fault prediction module may reside in.

FIG. 4 illustrates a third embodiment of a computer system in which the fault prediction module may reside in.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
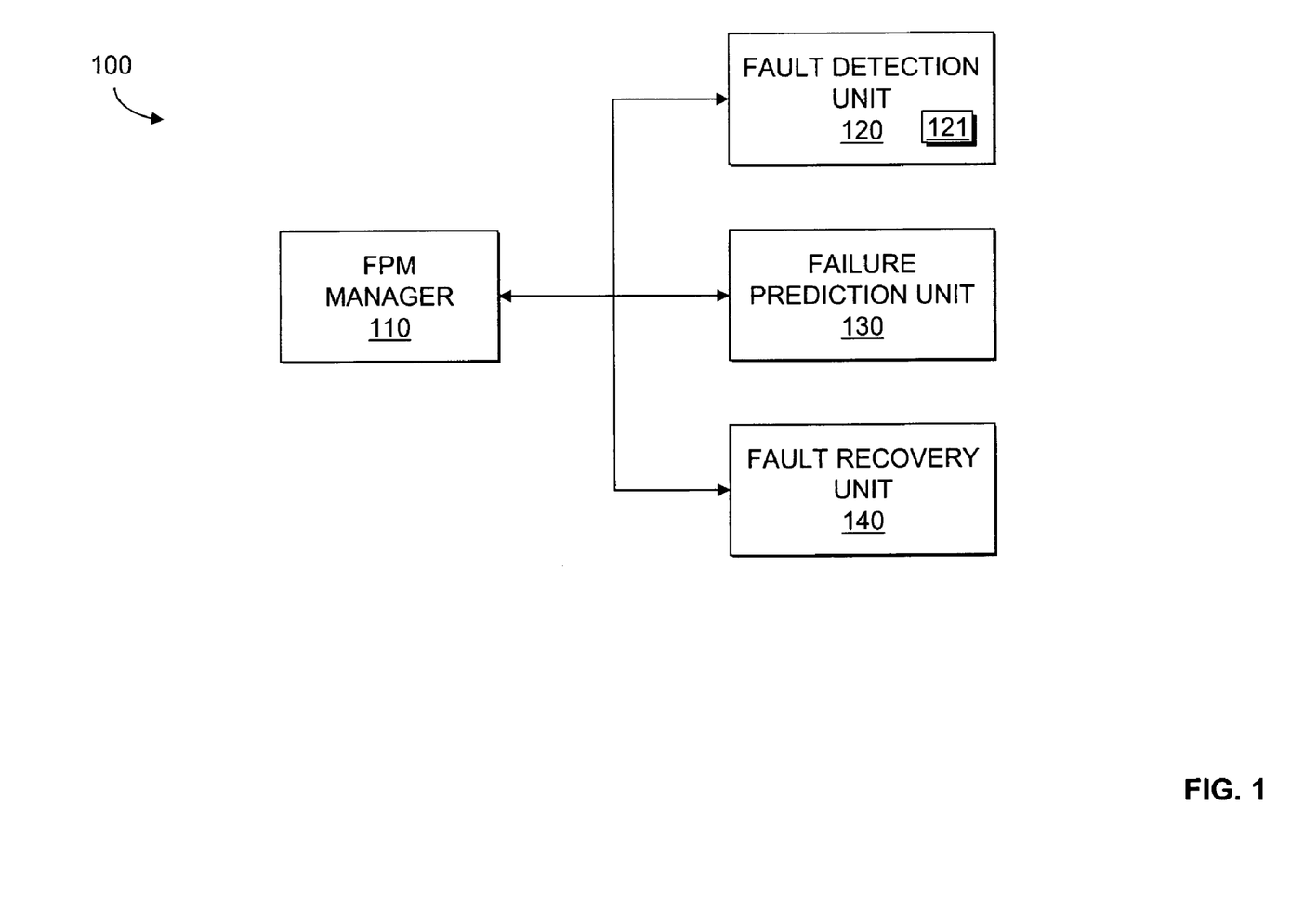
FIG. 1 is a block diagram that illustrates a fault prediction module according to an example embodiment of the present invention.

FIG. 1 is a block diagram of a fault prediction module 100 according to an embodiment of the present invention. The fault prediction module 100 detects errors occurring on applications running on a computer system, predicts the failure of an application, and initiates fault recovery. According to an embodiment of the present invention, an application may be an instance of software running on a processor, processing element, or a specialized processor core. An application may be an operating system running on a processor, firmware running on an embedded microcontroller or other code executed on a machine. The fault prediction module includes a fault prediction module (FPM) manager 110. The fault prediction module manager 110 interfaces with and transmits information between other components in fault prediction module 100. The fault prediction module manager 110 may be used to configure rules and policies applied to various components in the fault prediction module 100.

The fault prediction module 100 includes a fault detection unit 120. The fault detection unit 120 monitors a plurality of applications running in a system for errors. According to an embodiment of the fault prediction module 100, the fault prediction module manager 110 provides an application program interface (API) to applications running on the computer system to allow the applications to inform the fault prediction module manager 110 when an error has occurred and forward error information. The error information may include error type, severity of error and other related information. The fault detection unit 120 may include a plurality of error recorders 121 that record error information. According to an embodiment of the present invention, the error recorders 121 may be implemented using error counters. In one embodiment, an application may have a corresponding set of error recorders. The number of occurrence of each error type may be tracked by the error recorders 121. In another embodiment, the fault detection unit 120 monitors an application by reading the error recorders 121 associated with error occurrence. For an application that does not utilize application program interfaces, the fault detection unit 120 may also monitor the application by utilizing error handlers. The error handlers may read one or more system log files or private log files associated with the application for error occurrence and update the error recorders 121 to reflect the occurrence of an error.

The fault prediction module 100 includes a failure prediction unit 130. The failure prediction unit 130 analyzes the errors detected by the fault detection unit 120 and predicts whether an application or operating system will experience a critical failure ahead of time. The failure prediction unit 130 may correlate the various errors detected and isolate the root cause of the software problem.

The failure prediction unit 130 may utilize numerous prediction techniques. For example, the failure prediction unit 130 may perform prediction without a time window. In one embodiment, performing prediction without a time window involves predicting whether the errors detected will result in a failure by determining whether a number of errors of a particular type reach a threshold. The failure prediction unit 130 may perform adaptive error count prediction. In one embodiment, performing adaptive error count prediction involves comparing a number of faults detected against a critical threshold where the number of errors is decremented periodically to age the error information. The failure prediction unit 130 may perform adaptive time window prediction. In one embodiment, performing prediction with a time window involves determining whether a number of errors of a particular type reach a threshold within a time window. The failure prediction unit 130 may also adjust the time window (adaptive time window) to include a smaller period of time if error rate increases or a larger period of time if error rate decreases. This may also include tuning critical thresholds depending on the error rate besides time windows. The failure prediction unit 130 may use training mechanisms to learn appropriate values of heuristics parameters for various errors. In one embodiment, the training mechanisms may monitoring application failures and scan error records for determining data sets of sequence of errors or individual errors and its associated heuristics parameters. The training mechanisms may choose a data set having a highest probability of causing an application failure for each error (individual or a unique sequence). Heuristics parameters may include error rates, threshold counts, time windows, probabilities, and other parameters. In other embodiments, failure prediction unit 130 may use statistical variations to determine the probability of a critical failure.

It should be appreciated that the failure prediction unit 130 may apply a combination of these techniques or other techniques to a variety of applications and error types. In one embodiment, error types may be given a severity level, such as high, medium, and low. In this embodiment, when analyzing the errors, the error types may be weighted according to the severity levels. According to an embodiment of the present invention, errors relating to memory allocation, memory access violation and buffer overruns may be given a high severity level. Errors relating to interprocess communication mechanisms to send messages or information may be given a medium severity level. Errors relating to timer related systems call may be given a high severity level if the timer is critical to the proper functioning of the application. Errors related to invalid parameter or argument values being passed to the function invocations may be given a low severity level. Errors related to mismatch of the states of correlated software components may be given a high severity level. It should be appreciated that the categorization of errors into severity type may be used in the prediction techniques described earlier to determine probability of a critical failure of a given application.

The failure prediction module 100 includes a fault recovery unit 140. The fault recovery unit 140 operates to initiate fault recovery of an application or an operating system in response to a failure prediction made by the failure prediction unit 130. According to an embodiment of the failure prediction module 100, the fault recovery unit 140 may initiate a diagnostic of an application or an operating system. The fault recovery unit 140 may also restart an application or an operating system, save data from one or more applications, or initiate failover. Saving data may include saving data onto a storage medium for use later when the system is available. The fault recovery unit 140 may also initiate selective restart of a sub-component of the application which is causing failure e.g. an individual thread of a multi-threaded application. The fault recovery unit 140 may also perform audits to check communication links with other applications with which it is interacting with if a predicted failure is due to errors in interprocess communication mechanisms.

According to an embodiment of the fault prediction module 100, the fault detection unit 120 also monitors the sanctity of applications by checking the status of an application upon the expiration of a watch dog timer. The status of the application may be checked by reading a strobe or a watch dog counter corresponding to the application. The status may also be checked by sending messages to the application and getting acknowledgement back. The fault recovery unit 140 initiates recovery of the application after expiration of a recovery period.

It should be appreciated that watch dog counters and error recorders 121 may be implemented, for example, using any interprocess communication mechanism such as a shared memory, message queues, semaphores, sockets, or other mechanisms. Exemplary watch dog application program interface which may be implemented by the fault prediction module 100 are listed below.

1. Watch Dog Configuration
   a. Input Parameters: Application type, Application User ID, WatchDog Timeout Value, Watch Dog Implementation Type, Recovery Period, Recovery action information
   b. Output Parameters: Status, Identity of IPC, Unique Application ID
2. Start Monitoring Watch Dog
   a. Input Parameters: Unique Application ID
   b. Output Parameters: Status
3. Stop Monitoring Watch Dog
   a. Input Parameters: Unique Application ID
   b. Output Parameters: Status
4. Increment Watch Dog Counter
   a. Input Parameter: Unique Application ID
   b. Output Parameters: Status
5. Get Application Status
   a. Input Parameters: Unique Application ID
   b. Output Parameters: Watch Dog Counter Value, Active/Inactive Status Exemplary fault detection application program interface which may be implemented by the fault prediction module 100 are listed below.

Figure 2:
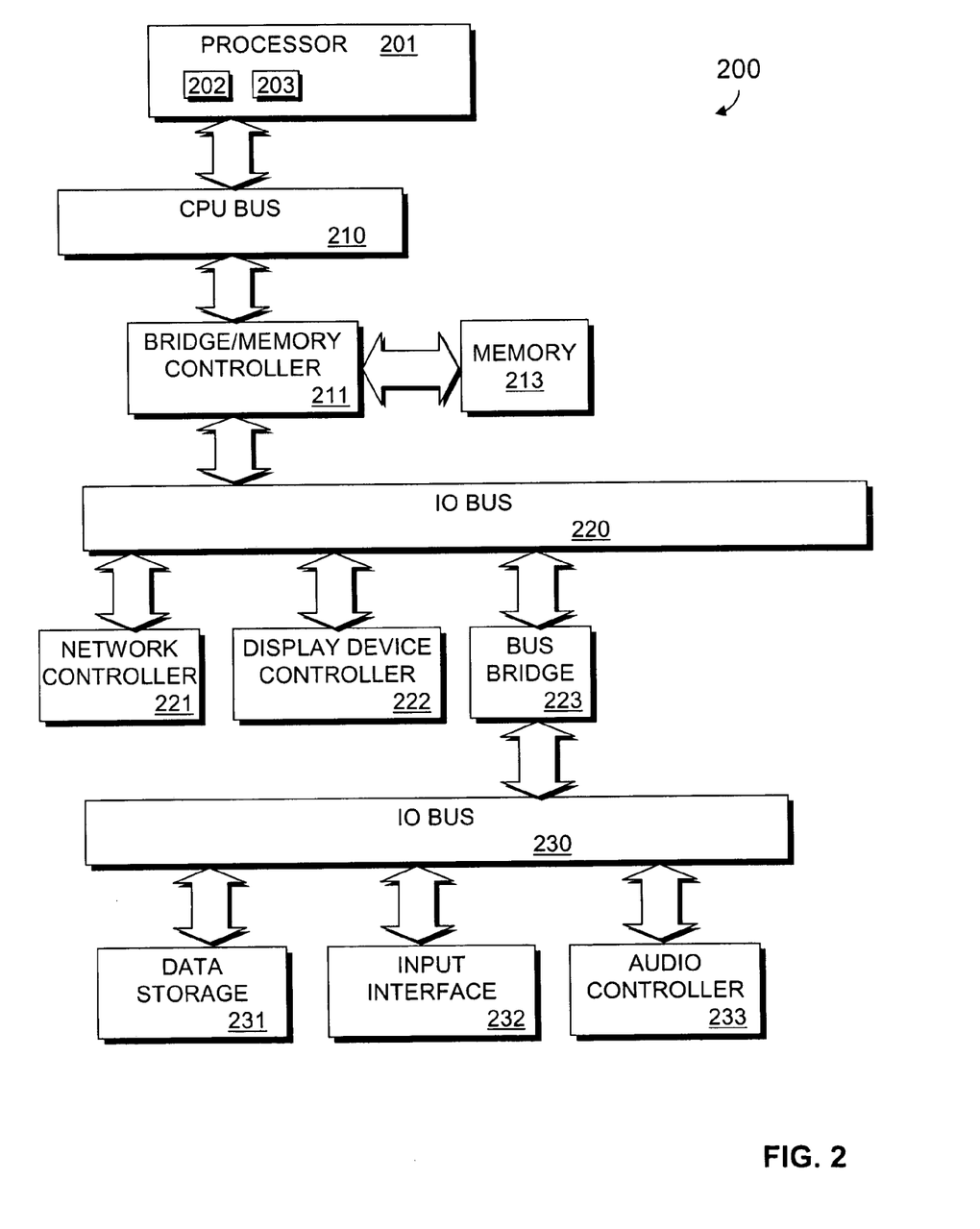

1. Configuration Error Recorders
   a. Input Parameters: Application Type, Application User ID, List of Error Information (like error types, counters, severity type), Prediction parameters like Leaky Bucket thresholds, time windows, probabilities, error rates
2. Update Error Recorder
   a. Input Parameters: Unique Application ID, Error Severity Value, Error Type, Error Info
   b. Output Parameters: Status
3. Reset Error Recorder
   a. Input Parameters: Unique Application ID, Error Severity Value, Error Type
   b. Output Parameters: Status
4. Get Error Recorder
   a. Input Parameters: Unique Application, List of Error Severity Values
   b. Output Parameters: Status, Error Recorder The fault prediction module may be implemented on a number of different types of computer systems. FIG. 2 illustrates a first computer system 200 in which a fault prediction module may be implemented. The computer system 200 includes a processor 201 that processes data signals. The processor 201 may be a complex instruction set computer microprocessor, a reduced instruction set computing microprocessor, a very long instruction word microprocessor, a processor implementing a combination of instruction sets, or other processor device. In an alternate embodiment, the processor can be a network processor having multiple processing elements or it can have multiple general purpose processing cores or combination of general purpose cores and specialized cores. The processor 201 is coupled to a CPU bus 210 that transmits data signals between processor 201 and other components in the computer system 200.

The computer system 200 includes a memory 213. The memory 213 may be a dynamic random access memory device, a static random access memory device, read-only memory, and/or other memory device. The memory 213 may store instructions and code represented by data signals that may be executed by the processor 201. According to an embodiment of the present invention, the processor 201 may execute an operating system and applications (shown collectively as 202) as well as implement a fault prediction module 203 to manage errors generated by the operating system and applications 202. The fault prediction module 203 may be implemented by the fault prediction module 100 shown in FIG. 1.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first IO bus 220.

According to an embodiment of the present invention, the processor 201 and bridge memory controller 211 may support virtualization where a plurality of virtual machines may function as a self-contained platform that runs its own software stack. In this embodiment, the fault prediction module 203 may reside and run in a protected partition of the processor 201 while the operating system and applications 202 reside and run in an open partition of the processor. This allows the fault prediction module 203 to monitor errors from the operating system and applications 202 while being isolated and protected from the impact of the errors.

According to an embodiment of the present invention, the computer system 200 may also include an embedded microcontroller where the fault prediction module can execute. The embedded microcontroller gives an isolated environment independent on the host processor to monitor the applications and OS(es) for predicting failures in these components.

The first IO bus 220 may be a single bus or a combination of multiple buses. The IO bus may also be connected through a controller to the memory controller. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 100.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated device or can reside in another device such as a bus controller or other controller. The input interface 232 allows coupling of an input device to the computer system 200 and transmits data signals from an input device to the computer system 200. An audio controller 233 is coupled to the second IO bus 230. The audio controller 233 operates to coordinate the recording and playing of sounds and is also coupled to the 10 bus 230. A bus bridge 223 couples the first IO bus 220 to the second IO bus 230. The bus bridge 223 operates to buffer and bridge data signals between the first IO bus 220 and the second IO bus 230.

Figure 3:
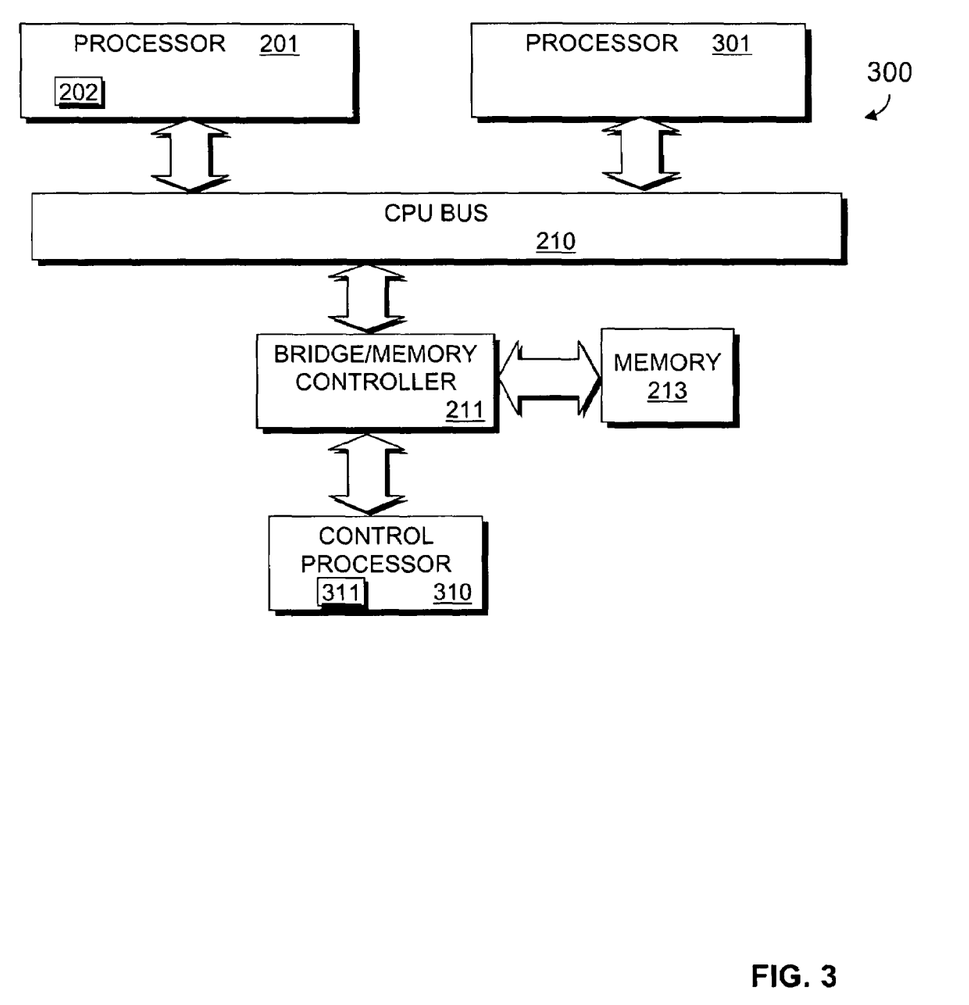

FIG. 3 illustrates a second computer system 300 in which a fault prediction module may be implemented. The computer system 300 includes components similar to those shown in FIG. 2. It should be appreciated that not all of the components illustrated in FIG. 3 are required for implementing the computer system 300. The computer system 300 includes a first processor 201 and an nth processor 301, where n may be any number. The computer system 300 includes a control processor 310. The control processor 310 may be a processor that is similar to the processor 201. The control processor 301 may be used by the computer system 300 to offload operations that may otherwise be performed by the processor 201. According to an embodiment of the present invention, a fault prediction module 311 may be implemented on the control processor 310 to manage errors from the operating system and applications 202 executed on processor 201. In another embodiment, fault prediction module 311 may executed on one of the processor cores of a processor on the computer system. The fault prediction module 311 may be implemented by the fault prediction module 100 shown in FIG. 1.

It should be appreciated that although a single processor is shown in FIG. 2, that the computer system 200 may also include a plurality of processors. It should further be appreciated that each of the processors in computer systems 200 and 300 may include a plurality of processor cores.

Figure 4:
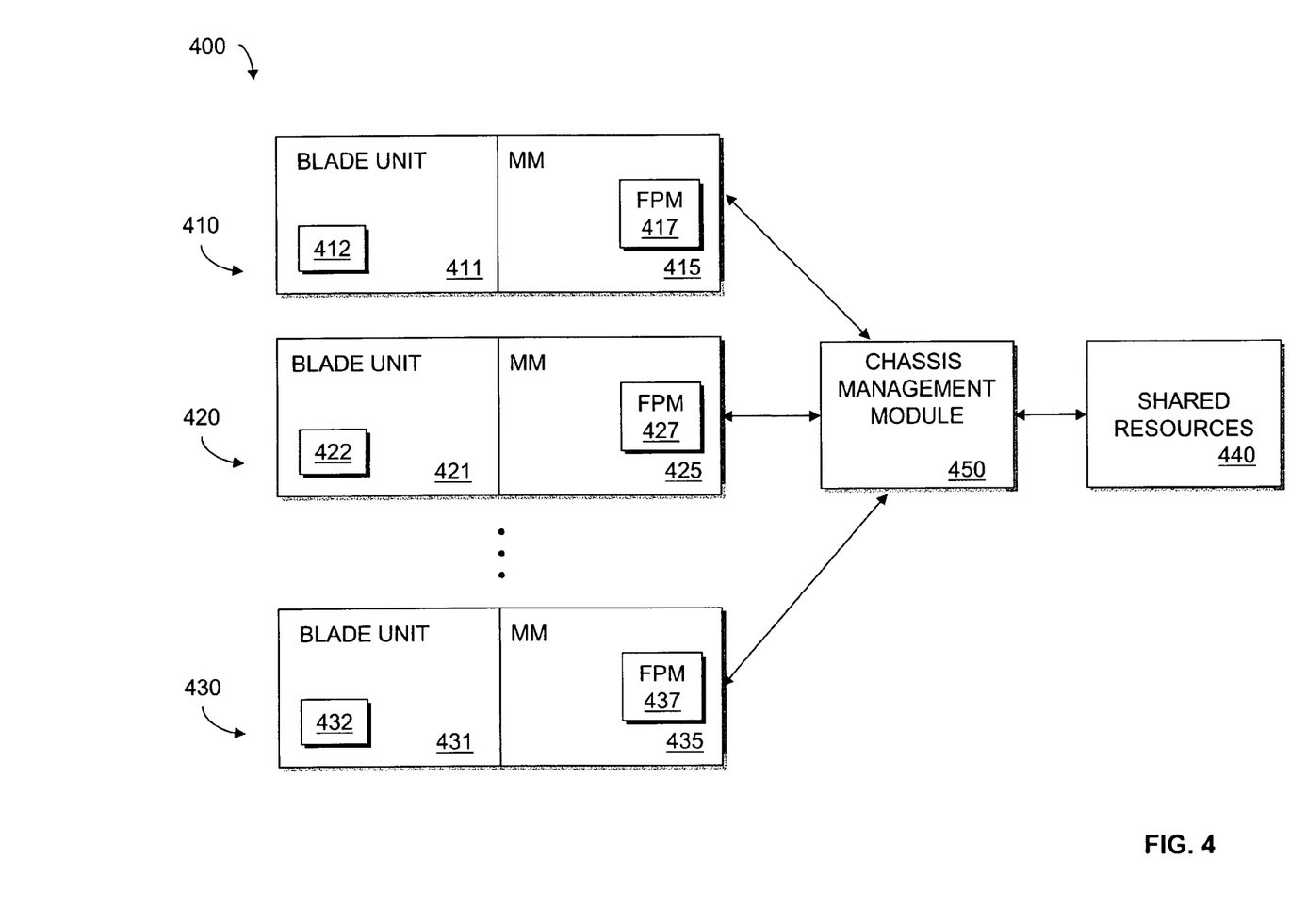

FIG. 4 illustrates a third computer system 400 in which a fault prediction module may be implemented. The computer system 400 is a blade server system. The computer system 400 includes a plurality of server blades. Block 410 represents a first server blade, block 420 represents a second server blade, and block 430 represents an nth server blade, where n may be any number. Each of the server blades 410, 420, and 430 may be implemented on a single circuit board. Server blades 410, 420, and 430 include blade units 411, 421, and 431 respectively. Each of the blade units 411, 421, and 431 is an inclusive computing system that may include one or more processors, memory, communication paths, and other resources. In one embodiment, the computer system described in FIG. 2 can be hosted on these blade units. According to an embodiment of the present invention, processors in the blade units 411, 421, and 431 may execute operating systems and applications 412, 422, and 432.

Server blades 410, 420, and 430 include management microcontrollers (MMs) 415, 425, and 435 respectively. The management microcontrollers 415, 425, and 435 provide monitoring and control functionality to its corresponding server blade. Each of the management microcontrollers 415, 425, and 435 may maintain event logs, manage sensor data, and support other functions for its corresponding server blade. In one embodiment, each of the management microcontrollers 415, 425, and 435 may also include a fault prediction module (FPM) 417, 427, and 437 and provide isolation from errors in the applications and host memory. The fault prediction modules 417, 427, and 437 manages the errors generated by operating systems and applications 412, 422, and 432. In another embodiment, fault prediction modules 417, 427, 437 may execute on a virtual partition of one of processing cores or elements of the blade. Each of the fault prediction modules 417, 427, and 437 may be implemented by the fault prediction module 100 shown in FIG. 1.

The blade server system 400 includes shared resources 440. The shared resources 440 may include a network interface, storage device, power supply, cooling/ventilation system, and/or other resources that may not be available on the server blades 410, 420, and 430 and must be shared among the server blades 410, 420, and 430.

The blade server system 400 includes a chassis management module (CMM) 450. The chassis management module 450 performs hardware management of the server blades 410, 420, and 430. For example, the chassis management module 450 may manage power allocation, insertion extraction, and compatibility checks for the server blades 410, 420, and 430.

It should be appreciated that the fault prediction module 100 shown in FIG. 1 may be implemented in a variety of environments using various techniques or procedures. For example, the fault prediction module 100 may be implemented as a set of native instructions on a processor. The instructions may be specifically designed and optimized for performing failure prediction. The fault prediction module 100 may be implemented in an application specific integrated circuit, field programmable gate array, in one or more processor core and/or processor chipset, or on a dedicated core in a multi-core processor system.

Figure 5:
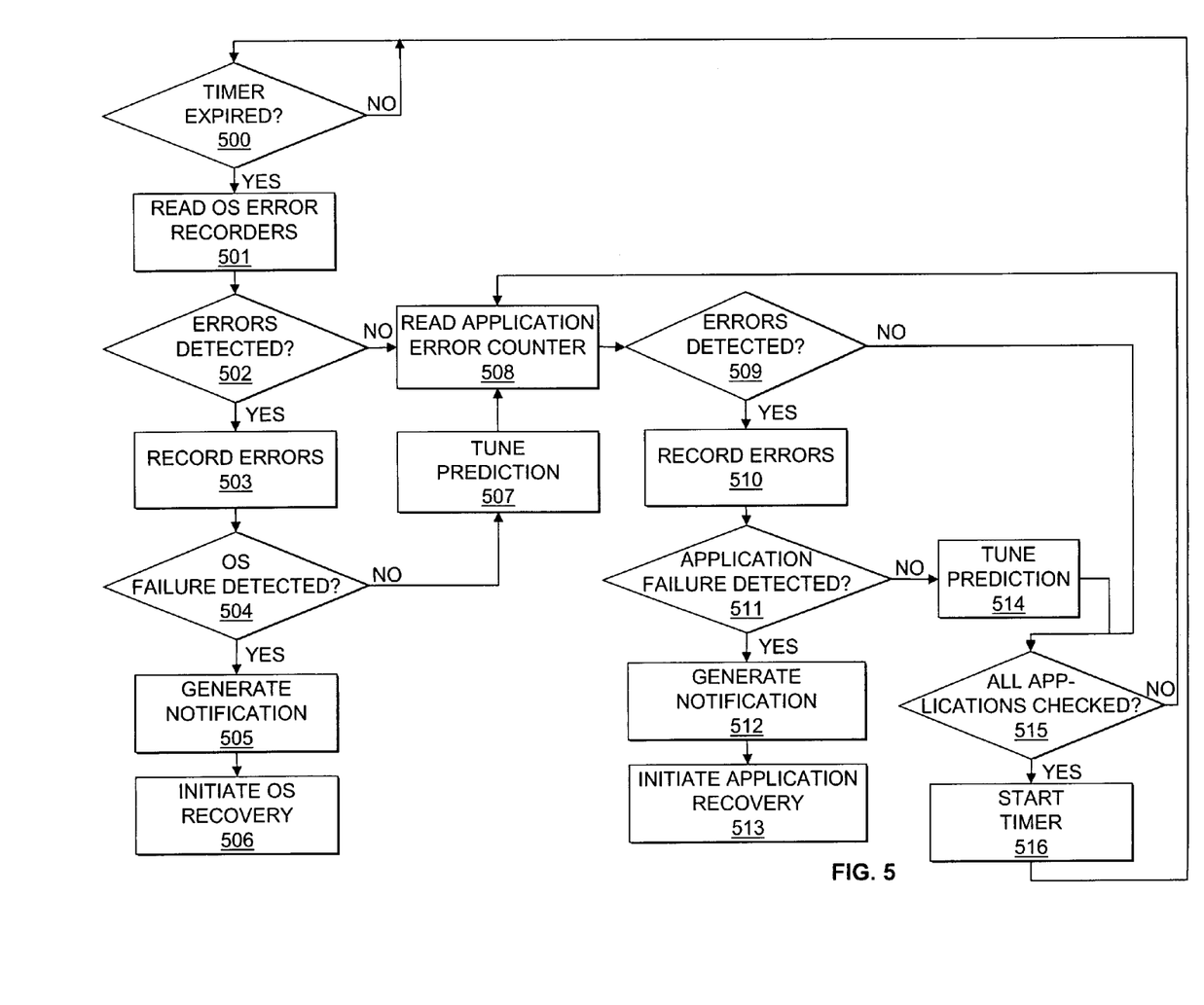
FIG. 5 is a flow chart illustrating a method for managing errors according to an embodiment of the present invention.

FIG. 5 is a flow chart illustrating a method for managing errors according to an embodiment of the present invention. At 500, it is determined whether a timer has expired. According to an embodiment of the present invention, the timer may be a periodic timer. If the timer has not expired, control returns to 500. If the timer has expired, control proceeds to 501.

At 501, error recorders related to operating system (OS) errors are read. According to an embodiment of the present invention, system log files may be read to determine the occurrence of errors for operating systems and applications that do not utilize application program interfaces to update error recorders. According to an embodiment of the present invention, the error recorders may be implemented with error counters.

At 502, it is determined whether an error that corresponds to or impacts the operating system has been detected. If an error is detected, control proceeds to 503. If an error is not detected, control proceeds to 508.

At 503, the error(s) is recorded.

At 504, it is determined whether an operating system failure is predicted. According to an embodiment of the present invention, failure may be predicted by analyzing the detected errors and their severity utilizing a number of prediction techniques including prediction with or without a time window, adaptive error count prediction, adaptive time window prediction, statistical variations using conditional probabilities and/or other techniques. If an operating system failure is predicted, control proceeds to 505. If an operating system failure is not predicted, control proceeds to 507. According to an embodiment of the present invention where multiple operating systems are running on a processor (using virtualization), the procedures described repeat for all the operating systems before proceeding to 508.

At 505, a notification of the predicted operating system failure is generated. According to an embodiment of the present invention, updating the probability of the instance error set is performed.

At 506, operating system recovery is initiated. Operating system recovery may include initiating failover, saving data, and restarting the operating system.

At 507, the prediction techniques are tuned. According to an embodiment of the present invention, if a time window is used in the prediction technique, the time window may be adjusted based on the increase or decrease of the error rate. The tuning also includes updating probability of instance being used for prediction analysis of a given error set and determining the instance of the highest probability.

At 508, error recorders related to application errors are read. According to an embodiment of the present invention, system log files may be read to determine the occurrence of errors for applications that do not utilize application program interfaces to update error recorders. According to an embodiment of the present invention, the error recorders may be implemented by error counters.

At 509, it is determined whether an error that corresponds to or impacts an application has been detected. If an error is detected, control proceeds to 510. If an error is not detected, control proceeds to 514.

At 510, the error(s) is recorded.

At 511, it is determined whether an application failure is predicted. According to an embodiment of the present invention, failure may be predicted by analyzing the detected errors and their severity utilizing a number of prediction techniques including prediction with or without a time window, adaptive error count prediction, adaptive time window prediction, statistical variations and/or other techniques. If an application failure is predicted, control proceeds to 512. If an application failure is not predicted, control proceeds to 514.

At 512, a notification of the predicted application failure is generated. According to an embodiment of the present invention, updating the probability of the instance error set is performed.

At 513, application recovery is initiated. Application recovery may involve initiating failover, saving data, or restarting the application or other appropriate actions.

At 514, the prediction techniques are tuned. According to an embodiment of the present invention, if a time window is used in the prediction technique, the time window may be adjusted may be adjusted depending on in response to an increase or decrease of an error rate. The tuning may also includes updating probability of instances being used for prediction analysis of a given error set and determining the instance of the highest probability.

At 515, it is determined if the error recorders for all applications have been checked. If all of the error recorders for all the applications have been checked, control proceeds to 516. If not all of the error recorders for all the applications have been checked, control returns to 508. According to an embodiment of the present invention, error recorders may be implemented using error counters.

At 516, the timer is started.

Figure 6:
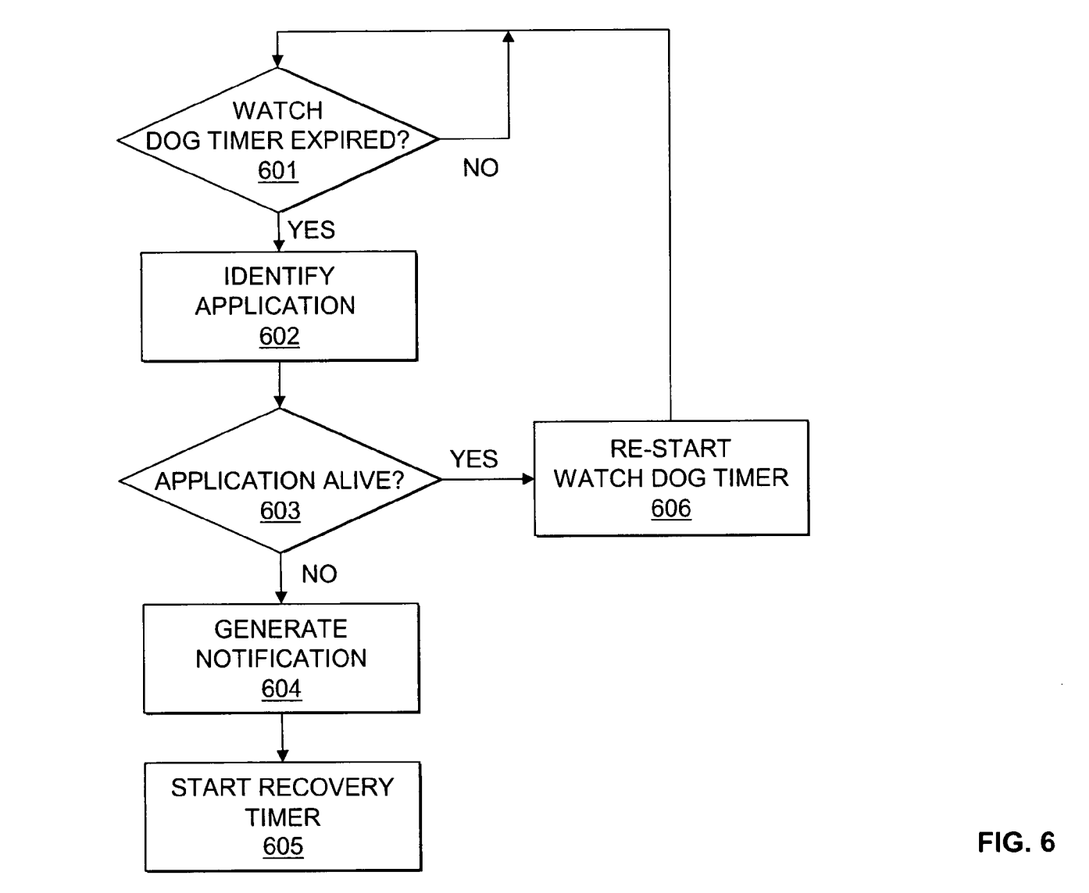
FIG. 6 is a flow chart illustrating a method for monitoring the operational status of an application according to an embodiment of the present invention.

FIG. 6 is a flow chart illustrating a method for monitoring the operational status of an application according to an embodiment of the present invention. At 601, it is determined whether a watch dog timer has expired. If the watch dog timer expired, control proceeds to 602. If the watch dog timer has not expired, control returns to 601.

At 602, the application for which the watch dog timer expired is identified.

At 603, it is determined whether the application is alive. According to an embodiment of the present invention, the determination may be made by invoking an interprocess communication mechanism to read a strobe or watch dog counter for the application. If the application is not alive, control proceeds to 604. If the application is alive, control proceeds to 606.

At 604, notification of the application failure is generated.

At 605, the error is recorded and a recovery period timer is started. According to an embodiment of the present invention, recovery is initiated after the recovery timer expires and the application is determined to still not be alive. Recovery may include writing data into storage, restarting an application, and/or initiating failover.

At 606, the watch dog timer is re-started. Control returns to 601.

Figure 7:
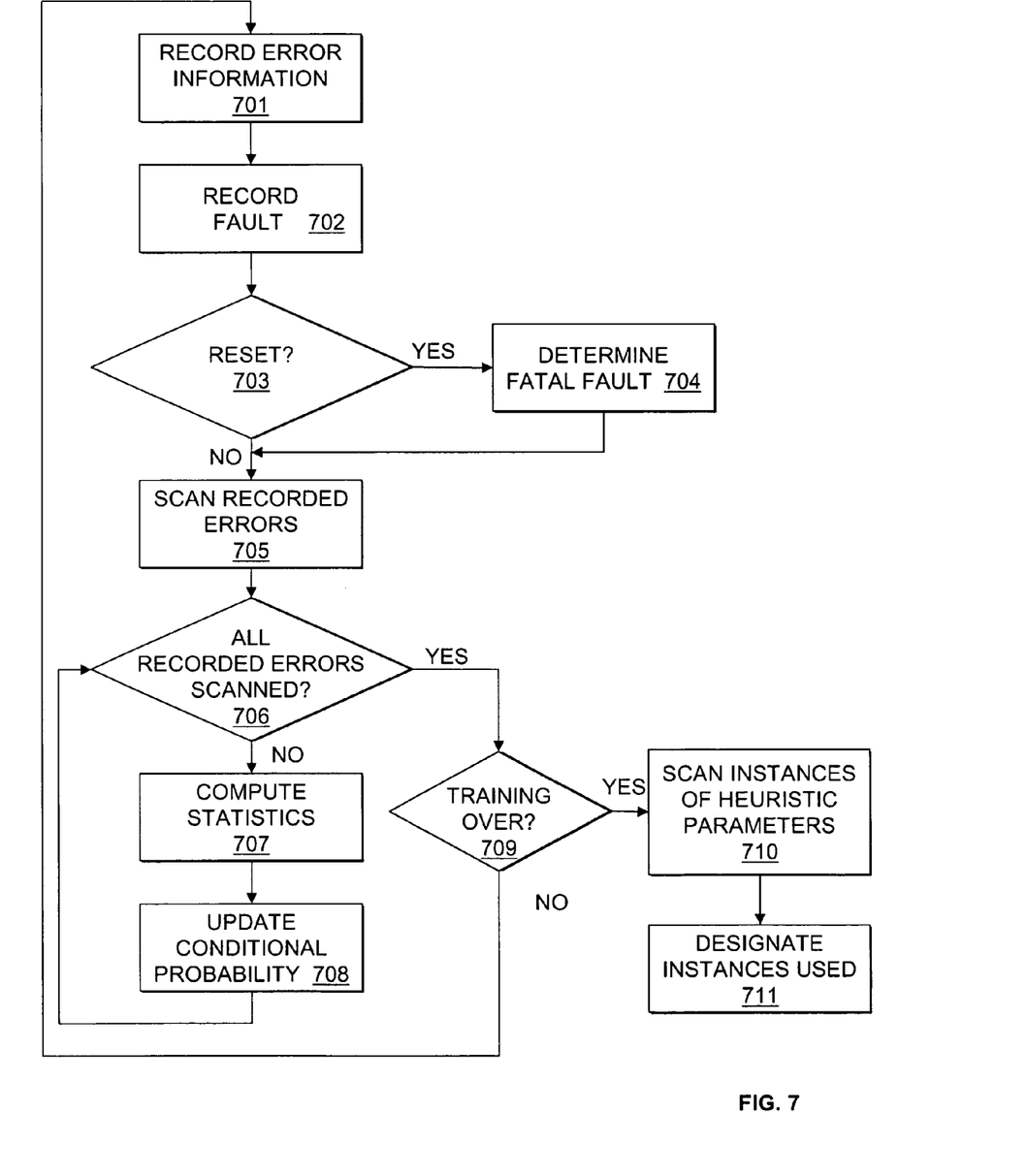
FIG. 7 is a flow chart illustrating a method for learning error sets according to an embodiment of the present invention.

FIG. 7 is a flow chart illustrating a method for learning error sets according to an embodiment of the present invention. At 701, error information is recorded. According to an embodiment of the present invention error information is recorded for each type and instance of an application. Error information may include time stamps, error types, error severity, and associated system calls that failed.

At 702, a fault leading to the application failure is recorded. Exemplary faults may include stack overflow or memory allocation failure. According to an embodiment of the present invention, a recorder is incremented to indicate the number of occurrence of the fault.

At 703, it is determined whether a platform needs to be reset. According to an embodiment of the present invention, the platform may be reset in response to a particular type of fault occurrence. If the platform is to be reset, the platform is reset and control returns to 704. If the platform is not to be reset, control proceeds to 705.

At 704, the fatal fault that led to the application failure is determined. According to an embodiment of the present invention, the fatal fault is determined by scanning the faults recorded at 702.

At 705, the relevant errors associated with the fault is identified. According to one embodiment, the relevant errors may be determined by scanning all previous error information recorded.

At 706, it is determined whether all relevant error information recorded has been scanned. If not all relevant error information recorded has been scanned, control proceeds to 707. If all relevant error information has been recorded, control proceeds to 709.

At 707, statistics are computed for the error to generate error sets. According to an embodiment of the present invention, an error set includes a combination of parameters such as a sequence or order of errors, time window, error count, and/or error rate. The conditional probability of the occurrence of an error may be determined. The conditional probability may take into account the probability of parent errors. According to an embodiment of the present invention, a time window, error count, and error rate is calculated for an error such as memory allocation failure. The number of occurrences of this instance may also be determined for a present training set to determine the conditional probability of the error set.

At 708, a conditional probability of this error set is updated. Control returns to 706.

At 709, it is determined whether a training period is over. According to an embodiment of the present invention, the training period is timed and control checks to see whether a predetermined period of time has expired. If the training period is not over, control returns to 701. If the training period is over, control proceeds to 710.

At 710, scan instances of heuristics parameters. According to an embodiment of the present invention, all instances of heuristic parameters determined in the training set (701-709) are scanned.

At 711, designate instances with highest probability as error set to be used in heuristic analysis.

FIGS. 5-7 are flow charts illustrating methods according to embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, or firmware that may include an article of manufacture on a machine accessible or a machine-readable medium having instructions. The instructions on the machine accessible medium may be used to program a computer system or other electronic device. The machine accessible medium may include, but is not limited to, floppy diskettes, optical disks, CD-ROMs, magneto-optical disks, or other type of media/machine accessible medium suitable for storing or transmitting electronic instructions. The techniques described herein are not limited to any particular software configuration. They may find applicability in any computing or processing environment. The term "machine accessible medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, firmware and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for managing a system, comprising:
    monitoring a plurality of software applications running in the system for software errors;
    predicting whether software errors detected would result in a failure of one of the plurality of software applications; and
    initiating fault recovery in response to a failure prediction by performing audits to check communication links with other applications with which the one of the plurality of software applications is interfacing if a predicted failure is due to errors in interprocess communication mechanisms, and performing one of restarting the one of the plurality of software applications, and initiating failover of the one of the plurality of software applications prior to its failure to change a condition of the system.

2. The method of claim 1, wherein monitoring the plurality of software applications comprises reading error recorders associated with error occurrence.

3. The method of claim 1, wherein monitoring the plurality of software applications comprises reading log files associated with the applications for error occurrence.

4. The method of claim 1, wherein predicting whether the software errors detected would result in a failure comprises determining whether a number of software errors of a particular type reaches a threshold.

5. The method of claim 4, wherein the number of software errors is decremented periodically to age fault information over time.

6. The method of claim 1, wherein predicting whether the software errors detected would result in a failure comprises determining whether a number of software errors of a particular type reaches a threshold within a time window.

7. The method of claim 6, further comprising adjusting the time window to include a smaller period of time if error rate increases.

8. The method of claim 6, further comprising adjusting the time window to include a larger period of time if error rate decreases.

9. The method of claim 1, further comprising:
determining whether an application is alive after an expiration of a watch dog timer; and
performing recovery after an expiration of a recovery timer.

10. The method of claim 1, wherein monitoring the plurality of applications comprises providing an application programming interface (API) to allow applications to log errors detected.

11. The method of claim 1, further comprising learning appropriate values of heuristics parameters for an error.

12. An article of manufacture comprising a machined accessible medium including sequences of instructions, the sequences of instructions including instructions which when executed cause the machine to perform:
monitoring a plurality of software applications running in the system for software errors;
predicting whether software errors detected would result in a failure of one of the plurality of software applications; and
initiating fault recovery in response to a failure prediction prior to a failure of the one of the software applications by performing audits to check communication links with other applications with which the one of the plurality of software applications is interfacing if a predicted failure is due to errors in interprocess communication mechanisms, and performing one of restarting the one of the plurality of software applications, and initiating failover of the one of the plurality of software applications.

13. The article of manufacture of claim 12, wherein monitoring the plurality of software applications comprises reading recorders associated with error occurrence.

14. The article of manufacture of claim 12, wherein predicting whether the software errors detected would result in a failure comprises determining whether a number of software errors of a particular type reaches a threshold.

15. The article of manufacture of claim 12, wherein the number of software errors is decremented periodically to age fault information over time.

16. The article of manufacture of claim 12, wherein predicting whether the software errors detected would result in a failure comprises determining whether a number of software errors of a particular type reaches a threshold within a time window.

17. A computer system, comprising:
a bus;
a memory;
a processor;
and a fault prediction module that includes a fault detection unit to monitor a plurality of software applications running in the system for software errors, a failure prediction unit to predict whether software errors detected will result in a failure in one of the plurality of software applications, and a fault recovery unit to initiate fault recovery in response to a failure prediction to change a condition of one of the computer system and the one of the plurality of software applications prior to a failure of the one of the plurality of software application by performing audits to check communication links with other applications with which the one of the plurality of software applications is interfacing if a predicted failure is due to errors in interprocess communication mechanisms, and performing one of restarting the one of the plurality of software applications, and initiating failover of the one of the plurality of software applications.

18. The computer system of claim 17, wherein the fault prediction module is implemented on an isolated partition on the processor.

19. The computer system of claim 17, wherein the fault prediction module is implemented as a set of processor native instructions designed and optimized for performing failure prediction.

20. The computer system of claim 17, wherein the processor executes a plurality of operating systems and applications.

21. The computer system of claim 17, wherein the fault prediction module is implemented on a dedicated microcontroller in the computer system.

22. The computer system of claim 17, wherein the fault prediction module comprises a plurality of error recorders.

23. The method of claim 1, wherein initiating fault recovery further comprises initiating a diagnostic of the one of the plurality of software applications prior to its failure.

24. The method of claim 1, wherein initiating fault recovery further comprises initiating a diagnostic of an operating system prior to its failure.

25. The method of claim 1, wherein initiating fault recovery further comprises saving data from the one of the plurality of software applications prior to its failure.

* * * * *